US012747175B2

(12) United States Patent
Chaalal

(10) Patent No.: US 12,747,175 B2
(45) Date of Patent: Sep. 29, 2026

(54) RECYCLING SYSTEM

(71) Applicant: Abu Dhabi University, Abu Dhabi (AE)

(72) Inventor: Omar Chaalal, Abu Dhabi (AE)

(73) Assignee: Abu Dhabi University, Abu Dhabi (AE)

(*) Notice: Subject to any disclaimer, the term of this patent is extended or adjusted under 35 U.S.C. 154(b) by 631 days.

(21) Appl. No.: 18/090,612

(22) Filed: Dec. 29, 2022

(65) Prior Publication Data

US 2024/0217853 A1 Jul. 4, 2024

(51) Int. Cl.

| | |
|---|---|
| ***C02F 9/00*** | (2023.01) |
| ***C02F 1/461*** | (2023.01) |
| ***C02F 1/52*** | (2023.01) |
| *C02F 103/34* | (2006.01) |

(52) U.S. Cl.

CPC ................ *C02F 9/00* (2013.01); *C02F 1/461* (2013.01); *C02F 1/5236* (2013.01); *C02F 2103/34* (2013.01); *C02F 2201/461* (2013.01)

(58) Field of Classification Search

CPC .... C02F 1/461; C02F 1/5236; C02F 2103/34; C02F 2201/461; C02F 9/00

See application file for complete search history.

(56) References Cited

FOREIGN PATENT DOCUMENTS

AU 2012384397 A1 * 1/2015 ............... C01D 7/07

* cited by examiner

*Primary Examiner* — Dirk R Bass

(57) ABSTRACT

An apparatus, including an electrolysis system, a first heat exchanger, a second heat exchanger, a bubble column reactor; a mixing vessel, a continuous stirred tank reactor, and a settling tank.

6 Claims, 19 Drawing Sheets

$$\dot{Q}_{NaOH} = -3.832 \times 10^{10} \frac{kJ}{yr}$$

This released energy can be recovered and used

| Stream Number | 19 | 20 | 21 | 22 | 23 | 24 | 25 | 26 | 27 | 28 |
|---|---|---|---|---|---|---|---|---|---|---|
| Temperature [°C] | 30 | - | 80 | 60 | 30 | - | 95 | 95 | 95 | 95 |
| Pressure [bar] | 0.5 | - | 0.5 | 0.5 | 0.5 | 0.5 | 0.5 | 0.5 | 0.5 | 0.5 |
| Total Mass Flow Rate (tpy) | $1.7428 \times 10^6$ | - | 95000 | $1.7428 \times 10^6$ | 95000 | - | $1.454 \times 10^5$ | $4.1328 \times 10^3$ | $1.42961 \times 10^6$ | $1.6404 \times 10^5$ |
| Total Mole Flow Rate (mole/yr) | $8.0027 \times 10^{10}$ | - | $2.1586 \times 10^9$ | $8.0027 \times 10^{10}$ | $2.1586 \times 10^9$ | - | $2.051 \times 10^9$ | $2.051 \times 10^9$ | $7.1825 \times 10^{10}$ | $4.10136 \times 10^9$ |

FIG. 13A

| Component Mass Flow Rates | | | | | | | | | | |
|---|---|---|---|---|---|---|---|---|---|---|
| Stream | 19 | 20 | 21 | 22 | 23 | 24 | 25 | 26 | 27 | 28 |
| NaCl | $4.358 \times 10^5$ | - | 0 | $4.358 \times 10^5$ | 0 | - | 0 | 0 | $1.9611 \times 10^5$ | 0 |
| $H_2O$ | $1.307 \times 10^6$ | - | 0 | $1.307 \times 10^6$ | 0 | - | 0 | 0 | $1.2335 \times 10^6$ | $1.14828 \times 10^5$ |
| $H_2$ | 0 | - | 0 | 0 | 0 | - | 0 | $4.1328 \times 10^3$ | 0 | 0 |
| $Cl_2$ | 0 | - | 0 | 0 | 0 | - | $1.454 \times 10^5$ | 0 | 0 | 0 |
| NaOH | 0 | - | 0 | 0 | 0 | - | 0 | 0 | 0 | 49212 |
| $Na_2CO_3$ | 0 | - | 0 | 0 | 0 | - | 0 | 0 | 0 | 0 |
| $CO_2$ | 0 | - | 95000 | 0 | 95000 | - | 0 | 0 | 0 | 0 |
| $(NH_4)_2CO_3$ | 0 | - | 0 | 0 | 0 | - | 0 | 0 | 0 | 0 |
| $NH_3$ | 0 | - | 0 | 0 | 0 | - | 0 | 0 | 0 | 0 |
| $NH_4OH$ | 0 | - | 0 | 0 | 0 | - | 0 | 0 | 0 | 0 |

FIG. 13B

| Stream Number | 29 | 30 | 31 | 32 | 33 | 34 | 35 | 36 | 37 | 38 |
|---|---|---|---|---|---|---|---|---|---|---|
| Temperature [°C] | 95 | 30 | 30 | 30 | 30 | 30 | 30 | 30 | 30 | 30 |
| Pressure [bar] | 0.9 | 0.7 | 0.5 | 1.5 | 1.5 | 1.5 | 2 | 1.4 | 1.4 | 1.2 |
| Total Mass Flow Rate (tpy) | 1.6404 x 105 | 1.6404 x 105 | 1.6404 x 105 | 37830 | 113490 | 151320 | 151320 | 197050 | 36943 | 343045 |
| Total Mole Flow Rate (mole/yr) | 4.10136 $\times 10^9$ | 4.10136 $\times 10^9$ | 4.10136 $\times 10^9$ | 2.2253 $\times 10^3$ | 6.2998 $\times 10^3$ | 4.3172 $\times 10^9$ | 4.3172 $\times 10^9$ | 2.05067 $\times 10^9$ | 2.05067 $\times 10^9$ | 5.8444 $\times 10^9$ |

FIG. 14A

| Component Mass Flow Rate | | | | | | | | | | |
|---|---|---|---|---|---|---|---|---|---|---|
| Stream Number | 29 | 30 | 31 | 32 | 33 | 34 | 35 | 36 | 37 | 38 |
| NaCl | 0 | 0 | 0 | 0 | 0 | 0 | 0 | 0 | 0 | 0 |
| $H_2O$ | 1.14828 x 105 | 1.14828 x 105 | 1.14828 x 105 | 0 | 113490 | 0 | 0 | 0 | 36943 | 0 |
| $H_2$ | 0 | 0 | 0 | 0 | 0 | 0 | 0 | 0 | 0 | 0 |
| $Cl_2$ | 0 | 0 | 0 | 0 | 0 | 0 | 0 | 0 | 0 | 0 |
| NaOH | 49212 | 49212 | 49212 | 0 | 0 | 0 | 0 | 0 | 0 | 0 |
| $Na_2CO_3$ | 0 | 0 | 0 | 0 | 0 | 0 | 0 | 0 | 0 | 206480 |
| $CO_2$ | 0 | 0 | 0 | 0 | 0 | 0 | 0 | 0 | 0 | 0 |
| $(NH4)_2CO_3$ | 0 | 0 | 0 | 0 | 0 | 0 | 0 | 197050 | 0 | 0 |
| $NH_3$ | 0 | 0 | 0 | 37830 | 0 | 0 | 0 | 0 | 0 | 0 |
| $NH_4OH$ $(NH_3+H_2O)$ | 0 | 0 | 0 | 0 | 0 | 151320 | 151320 | 0 | 0 | 136565 |

FIG. 14B

| Stream Number | 39 | 40 | 41 |
|---|---|---|---|
| Temperature [°C] | 30 | 30 | 30 |
| Pressure [bar] | 0.9 | 0.9 | 1.5 |
| Total Mass flow rate (tpy) | 206480 | 136565 | 136565 |
| Total Mole Flow Rate (mole/yr) | $1.9481 \times 10^9$ | $3.8963 \times 10^9$ | $3.8963 \times 10^9$ |
| Component Mass Flow Rates | | | |
| NaCl | 0 | 0 | 0 |
| H2O | 0 | 0 | 0 |
| $H_2$ | 0 | 0 | 0 |
| $Cl_2$ | 0 | 0 | 0 |
| NaOH | 0 | 0 | 0 |
| $Na_2CO_3$ | 206480 | 0 | 0 |
| $CO_2$ | 0 | 0 | 0 |
| $(NH_4)_2CO_3$ | 0 | 0 | 0 |
| $NH_3$ | 0 | 0 | 0 |
| $NH_4OH$ ($NH_3$+$H_2O$) | 0 | 136565 | 136565 |

FIG. 15

RECYCLING SYSTEM

BACKGROUND

Over the course of time, various industrial processes that utilize desalinization processes have resulted in brine being dumped into the world's oceans. As a result of the dumping of brine, seawater salinity has also been increasing over the same period of time. In addition to the brine being dumpted into the world's oceans, carbon dioxide levels have also been increasing. At the present time, there is no system that can resolve the issues of reducing seawater salinity and decreasing carbon dioxide levels

BRIEF DESCRIPTION OF DRAWINGS

FIGS. 13A and 13B are example tables showing information associated with a recycling system;

FIGS. 14A and 14B are example tables showing information associated with a recycling system;

FIG. 15 is an example table showing information associated with a recycling system.

DETAILED DESCRIPTION OF PREFERRED EMBODIMENTS

The following detailed description refers to the accompanying drawings. The same reference numbers in different drawings may identify the same or similar elements. Systems, devices, and/or methods described herein may allow for the simultaneous reduction of seawater salinization levels and carbon dioxide levels.

Carbon dioxide ($CO_2$) levels in the atmosphere have risen due to massive industrial development around the world. Similarly, the seawater salinity has been increasing for decades as a result of the dumped brine from desalination plants into seas and oceans. Systems, devices, and/or methods described herein combines $CO_2$ with rejected saline water that aims to resolve two major environmental threats and also to produce useful products. Systems, devices, and/or methods described herein use rejected brine from desalination plants instead of dumping the brine into the region seas.

In embodiments, metals may be also extracted from the rejected brine. Consequently, the designed process utilizes a new $CO_2$ capturing technique. Accordingly, $CO_2$ coming from any external source will be treated in a bubble column reactor. In embodiments, the product from the bubble column reactor may be used in a series of step reactions in the process. In embodiments, the process further produces hydrogen and chlorine from the pretreated brine. Accordingly, systems, devices, and/or methods described will sequestrate toxic carbon dioxide, reduce the salinity of seawater, and produce sellable chemicals.

Accordingly, the system, devices, and/or methods described herein, carbon dioxide is combined with rejected saline water to accomplish several goals. The first goal is to reduce the environmental threats of water salizination and increasing carbon dioxide levels. The second goal is, via removal of brine (which is causing the increased salizination levels) from the seawater, to extract various types of metals from the extracted brine.

In embodiments, the system, devices, and/or methods described herein, carbon dioxide is received and is treated by a bubble column reactor. In embodiments, the product of the bubble column reactor is then used in a series of step reactions which ultimately result in the production of hydrogen and chlorine from the pretreated brine. Thus, as an alternative to brine disposal, the systems, devices, and/or methods described herein have been developed for the reuse of saline waste coming from reverse osmosis desalination plants in the production of green hydrogen and chlorine by electrolysis in membrane cells.

Figure 1:
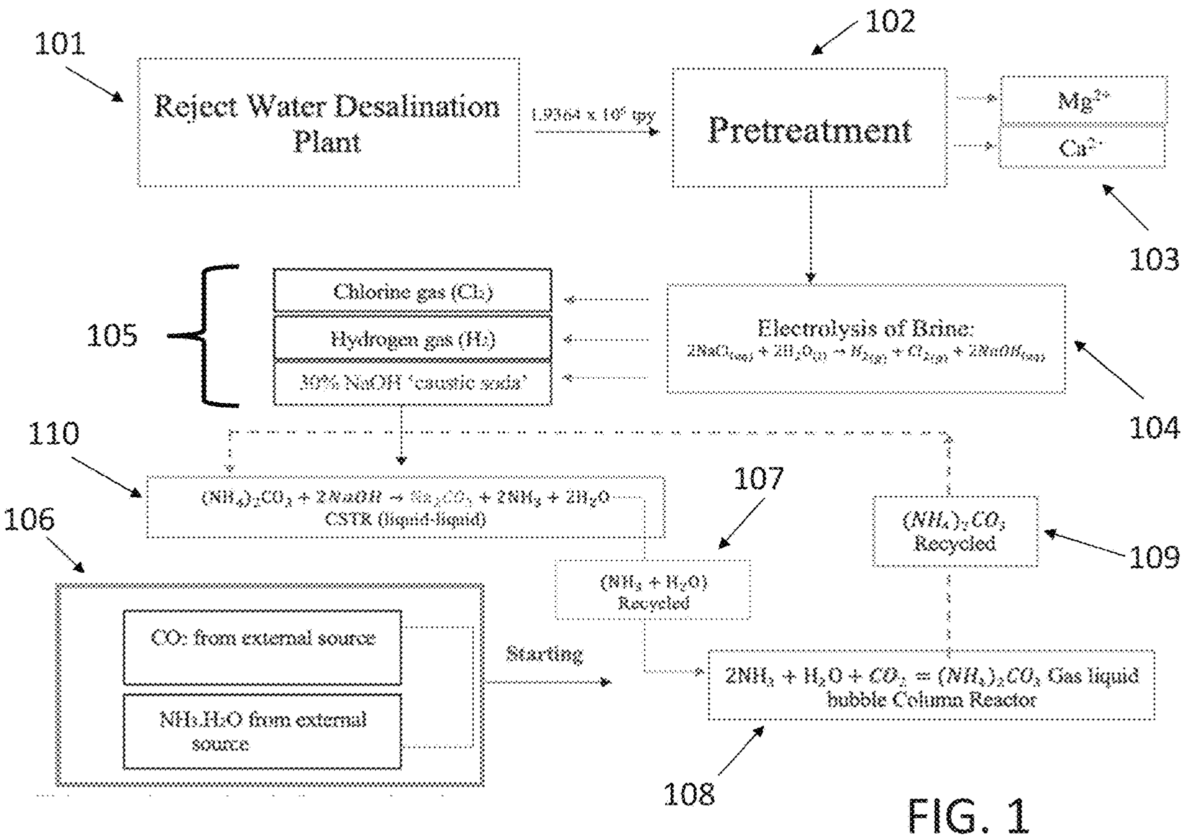
FIG. 1 is a diagram of an example block diagram.

FIG. 1 is an example block diagram of system 100. As shown in FIG. 1, block 101 represents a reject water desalination plant that includes brine that is then exposed to a pretreatment process (e.g. a heat exchanger such as described in FIGS. 2-4), represented by block 102, to remove the valuable metals, such as magnesium ($Mg^{2+}$) and calcium ($Ca^{2+}$) as shown in block 103. As further shown in FIG. 1, as shown in block 104, an electrolysis process (similar to that described in FIG. 5) in conducted onto the NaCl and $H_2O$ (from the brine) and, as shown in block 105, produces three products, chlorine gas ($Cl_2$), hydrogen gas ($H_2$) and caustic soda (NaOH). As shown in FIG. 1, $(NH_4)_2CO_3$ is from the electrolysis process shown by block 104.

As further shown in block 106 of FIG. 1, carbon dioxide, $CO_2$, and an ammonia solution, $NH_3H_2O$, are introduced into system 100. As shown in block 107, the ammonia mix is shown with its separate elements (water and ammonia). At block 108, which may represent a bubble column reactor, a reaction between the ammonia and the carbon dioxide occurs and produces $(NH_4)_2CO_3$ as shown in block 109. As shown in block 110 of FIG. 1, $(NH_4)_2CO_3$ and the caustic soda are mixed together in a continuous stirred reactor to generate $Na_2CO_3$ which is the ammonia solution that will be recycled to be fed back in the $CO_2$ sequestration reaction that takes place in the bubble column reactor.

Figure 2:
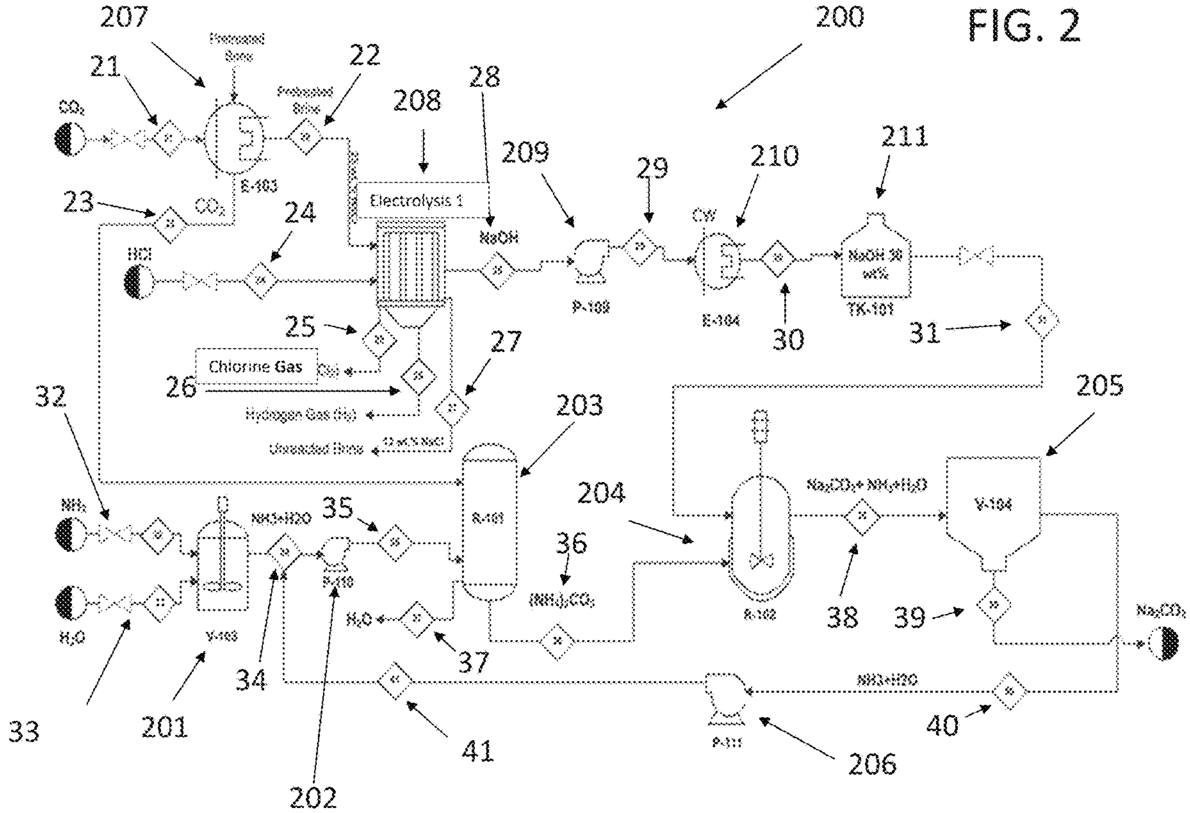
FIG. 2 is a diagram of an example recycling diagram.

FIG. 2 describes an example recycling system 200. As shown recycling system 200 includes mixing vessel 201, pump 202, bubble column reactor 203, continuous stirred tank reactor 204, settling tank 205, pump 206, heat exchanger 207, electrolysis 208, pump 209, heat exchanger 210, and tank 211. In embodiments, piping sections between each element of recycling system 200 may be made of 90/10 copper-nickel material and be able to withstand any corrosion issues from seawater used within recycling system 200.

As shown in FIG. 2, a stream 32 of ammonia ($NH_3$) (and may have a quantity of 35,942.0625 tpy) and a stream of water ($H_2O$) (and may have a quantity of 107,826.1875 tpy) is sent to mixing vessel 201. No reaction occurs between the $NH_3$ and $H_2O$ and mixing vessel 201 generates an ammonia solution of $NH_3$+$H_2O$ (and may have a quantity of 143, 768.25 tpy) which is $NH_4OH$. Next, as shown in FIG. 2, the ammonia solution is sent (pumped by pump 202) as stream 34 (which may have a quantity of 151,320 tpy) through pump 202 and then exits as stream 35 (with a similar or same quantity as stream 34) into bubble column reactor 203. In embodiments, stream 23 which includes cooled $CO_2$ is also sent to bubble column reactor 203. In embodiments, bubble column reactor 203 causes a reaction between the $NH_4OH$ and $CO_2$ and results in $(NH_4)_2CO_3$. In embodiments, the $(NH_4)_2CO_3$ is sent, via stream 36 (which may have a quantity of 197,050), and NaOH is sent, via stream 31 (which may have a quantity of 164,404 tpy) from tank 211, to continuous stirred tank reactor 204. In addition, a stream 37 (and may have a quantity of 36,943 tpy) of $H_2O$ is sent out from bubble column reactor 203

In embodiments, continuous stirred tank reactor 204 will produce of mixture of $Na_2CO_3$+($NH_3$+$H_2O$) as shown by stream 38 (and may have a quantity of 343,045 tpy) based on stream 37 and stream 31. To prevent any issues with solid particles of $Na_2CO_3$, the $Na_2CO_3$+($NH_3$+$H_2O$) is sent to settling tank 205. In embodiments, settling tank 205 physically separates the mixture to create two separate streams of product. As shown in FIG. 2, stream 39 includes $NH_2CO_3$ (and may include a quantity of 206,480 tpy) which is a product that can be used in other processes. Also, as shown in FIG. 2, stream 40 (and which may be a quantity of 206,480 tpy) includes an ammonia solution, $NH_3$+$H_2O$, that is recycled back via pump 206 so that the ammonia solution can react with $CO_2$. Thus, a large amount ammonia solution generated by streams 32 and 33 (exceeding 14,755 tpy) only occurs for the initial first run while additional runs are based on the recycled stream 40 of ammonia solution. For additional runs, a quantity of ammonia solution (generated by streams 32 and 33) may be provided that does not exceed 14,755 tpy.

Also, as shown in FIG. 2, carbon dioxide, $CO_2$, enters recycling system 200 via stream 21. In embodiments, stream 21 enter heat exchanger 207. In embodiments, stream 21 have a quantity of 90,250 tpy. In embodiments, heat exchanger 207 (and heat exchanger 210) are constructed of materials that are resistant to corrosion due to seawater and also resistant to solid waste. In embodiments, heat exchangers 207 and 210 can be manufactured of titanium. Also, as shown in FIG. 2, heat exchanger 207 also receives pretreated brine. In embodiments, the quantity of pretreated brine may have a quantity of $1742800 \times 10^6$ tpy. Next, the $CO_2$, after being cooled down based on the heat exchange process (by heat exchanger 207), is sent via stream 23 to bubble column reactor 203 (as discussed previously). In embodiments, stream 22 which includes the pretreated brine is sent to electrolysis 208. In embodiments, stream 22 may have a quantity of $1742800 \times 10^6$ tpy. In embodiments, stream 23 may have a quantity of 90,250 tpy. In embodiments, electrolysis 208 conducts an electrolysis process is conducted on sodium chloride (NaCl) and water ($H_2O$) which is part of the pretreated brine. In embodiments, the desalination reject purification is extremely important step for the brine before its entry to the electrolysis unit because all impurities will be removed through filtration process.

In embodiments, the electrolysis process of the pretreated brine results in the production of new materials from the brine in the process which includes chlorine gas ($Cl_2$), Hydrogen gas ($H_2$) and Sodium Hydroxide (NaOH). In embodiments, the electrolysis process of the brine (sodium chloride, NaCl) includes a membrane cell that is based on the "Chlor-alkali" technique.

Figure 5:
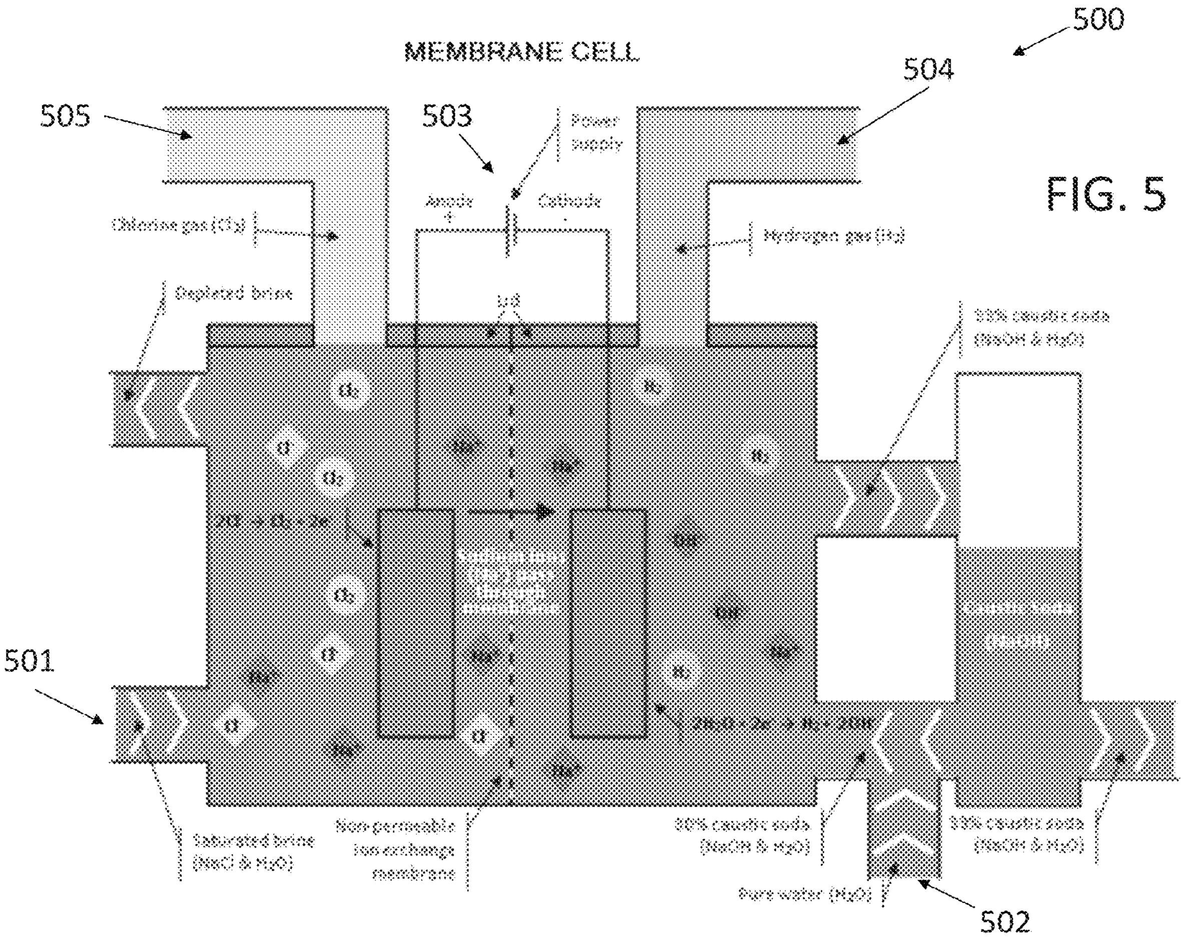
FIG. 5 is a diagram of an example membrane cell.

FIG. 5 describes an example membrane cell 500 which may be similar to the system shown as electrolysis 208, electrolysis 309, and electrolysis 409. As shown in FIG. 5, the process of electrolysis starts with filling brine in the anode chamber 501 placed within the electrolytic cell. Then, filling pure water (deionized or Q-milli) in the cathode chamber 502 of the cell. After that, a direct current should be supplied to the process. The role of the current is to disperse the solution into cations and anions in which each will move to the opposite charged electrode. In the figure, the hydrogen cations H+ are attracted to the cathode and the chlorine anions are attracted toward the anode. Consequently, to form the NaOH solution which is sodium hydroxide, or as commonly named caustic soda, Na+ ions only diffuse through the ion exchange membrane to reach the pure water within the cathode chamber in which the Na+ will react with OH− found in the pure water to produce NaOH.

Back to FIG. 2, this caustic soda (NaOH) to be sent through stream 28 (which may have a quantity of 164,040 tpy) via pump 209 to stream 29 (which may have a quantity of 164,040 tpy) and then to heat exchanger 210 and then via stream 30 (which may have a quantity of 164,040 tpy) to tank 211 where the caustic soda is collected at concentration around 30%. Finally, at the cathode (shown as 504 in FIG. 5) the hydrogen gas will be collected and transferred to the hydrogen container via stream 26. In embodiments, the hydrogen leaving the electrolysis 208 is extremely concentrated (it usually has concentration higher than 99.9% by volume). In embodiments, the chlorine gas collected at the anode (shown as 505 in FIG. 5) is transferred via stream 25 to a chlorine container.

As shown in FIG. 2 the NaOH is then sent via stream 28 to pump 209 which then pumps stream 29 to heat exchanger 210 which uses entering cold water to reduce the temperature of the NaOH. As shown in FIG. 2, the NaOH is sent via stream 30 to tank 211. In embodiments, the NaOH solution consists of a 30% concentration. As described above, the NaOH solution is then sent via stream 31 to continuous stirred tank reactor 204 and used in further processes (as described previously).

Figure 3:
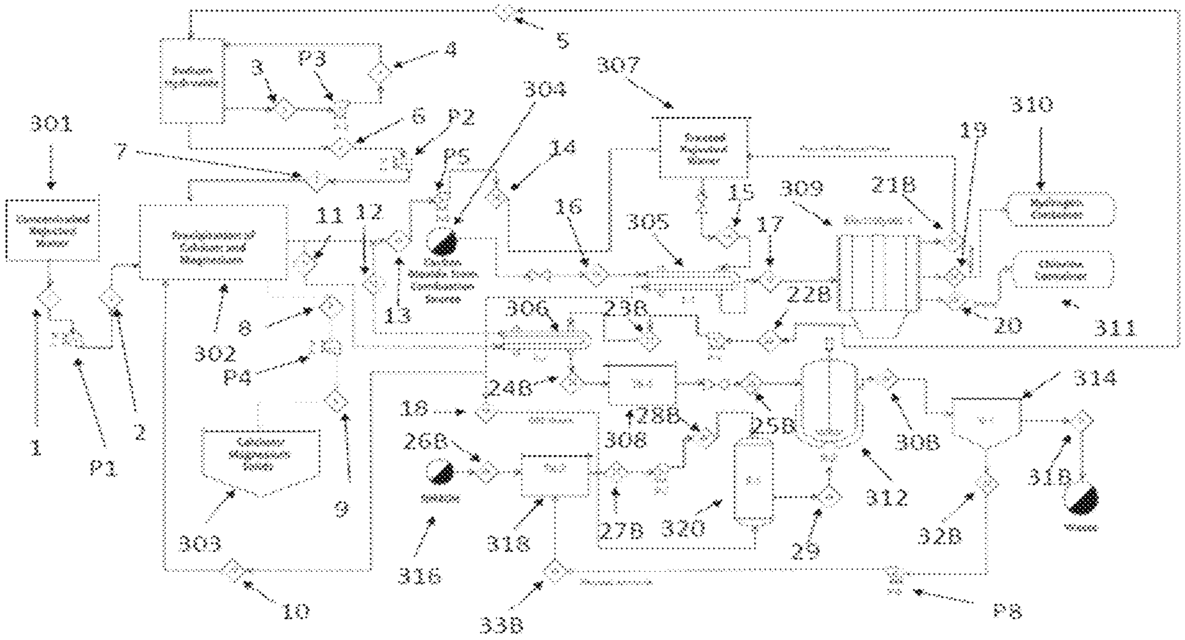
FIG. 3 is a diagram of an example recycling system.

FIG. 3 describes an example recycling system 300. As shown recycling system 300 includes concentrated rejected water 301, precipitation of calcium and magnesium 302, calcium/magnesium solids 303, carbon dioxide from combustion source 304, heat exchanger 305, heat exchanger 306, treated rejected water 307, tank 308, electrolysis 309, hydrogen container 310, chlorine container 311, bubble column reactor 312, settling tank 314, ammonia hydroxide source 316, tank 318, continuous stirred tank reactor 320. In addition, recycling system 300 also includes piping sections through which streams of chemicals (such as stream 26B includes ammonia hydroxide). In embodiments, piping sections between each element of recycling system 300 may be made of 90/10 copper-nickel material to be able to withstand any corrosion issues from seawater.

As shown in FIG. 3, concentrated rejected water 301 is sent via stream 1 to pump P1 and then via stream 2 to a tank with precipitation of calcium and magnesium based on a reaction of sodium hydroxide. As a result of the reaction with sodium hydroxide, calcium and magnesium solids are generated and stored in one or more tank (for each product)—calcium and magnesium 303 via stream 8, pump P9, and then stream 9. Also, as shown in FIG. 3, the remaining rejected water (which includes brine from a facility, such as a desalinization facility) is sent via stream 13, pump P5, and stream 14 as treated rejected water 307, which will be discussed further.

Also shown in FIG. 3, carbon dioxide from combustion source 304 is sent via stream 16 to heat exchanger 305. As discussed previously, treated rejected water 307 is sent via stream 15 through heat exchanger 305 to cool down the carbon dioxide in stream 16. The rejected water is then sent to electrolysis 309 (via stream 17) while the cooled down carbon dioxide is sent via stream 18 to continuous stirred tank reactor 320 and will be discussed further.

In embodiments, and as shown in FIG. 3, the treated brine water 307 sent to electrolysis 309 undergoes an electrolysis similar to that described in FIG. 5 and, as a result, unreacted brine, hydrogen, and chlorine are produced. In embodiments, the unreacted brine is sent, via stream 21B with the treated rejected water and undergoes additional electrolysis in a loop. In embodiments, the hydrogen is sent to hydrogen container 310 and the chlorine is sent to chlorine container 311.

As shown in FIG. 3, carbon dioxide is sent via stream 18 to continuous stirred tank reactor 320. In addition, as shown in FIG. 3, $NH_4OH$ (ammonium hydroxide) is sent via stream 26B is sent to tank 318 where it may mix with ammonia (from stream 33B) that comes from settling tank 314. In embodiments, the output of tank 318 is stream 27B that is pumped to stream 28B that then sends the $NH_4OH$ to continuous stirred tank reactor 320 which produces a mixture of $Na_2CO_3$+($NH_3$+$H_2O$) as shown by stream 27B which is sent to bubble column reactor 312.

In addition to stream 27B being sent to bubble column reactor 312, sodium hydroxide (NaOH) is also sent to bubble column reactor 312. Prior to entering bubble column reactor 312, the NaOH is first sent from stream 22B (from electrolysis 309) to a pump and then stream 23B. In embodiments, stream 23B is then sent through heat exchanger 306 where it is cooled down by treated rejected water (via stream 11). As shown in FIG. 3, the treated rejected water with the captured heat from the NaOH is then resent back, via stream 12, to the treated rejected water in stream 13.

In embodiments, the cooled NaOH is then sent out of heat exchanger 306 via stream 24B to tank 308. As shown in FIG. 3, the cooled NaOH is then sent via stream 25B to bubble column reactor 312. In embodiments, bubble column reactor 312 causes a reaction between the $NH_4OH$ and CO2 and results in $(NH_4)_2CO_3$. In embodiments, the $(NH_4)_2CO_3$ is sent, via stream 30B, and NaOH is sent, via stream 32 from tank 211, to continuous stirred tank reactor 314.

In embodiments, settling tank 314 physically separates the mixture to create two separate streams of product. To prevent any issues with solid particles of $Na_2CO_3$, the $Na_2CO_3$+($NH_3$+$H_2O$) is also sent to settling tank 314. In embodiments, settling tank 314 physically separates the mixture to create two separate streams of product. As shown in FIG. 3, stream 31B includes $NH_2CO_3$ which is a product that can be used in other processes or also can be simply waste. Also, as shown in FIG. 3, stream 32B includes an ammonia solution, $NH_3$+$H_2O$, that is recycled back via pump P8 and then to stream 33B and sent back to tank 318 so that the ammonia solution can again react with $CO_2$. Thus, a large amount ammonia solution via stream 26B (exceeding 14,755 tpy) only occurs for the initial first run while additional runs are based on the recycled stream 33B of ammonia solution. At additional runs, a quantity of ammonia solution (generated by streams 26B) may be provided that does not exceed 14,755 tpy.

Figure 4:
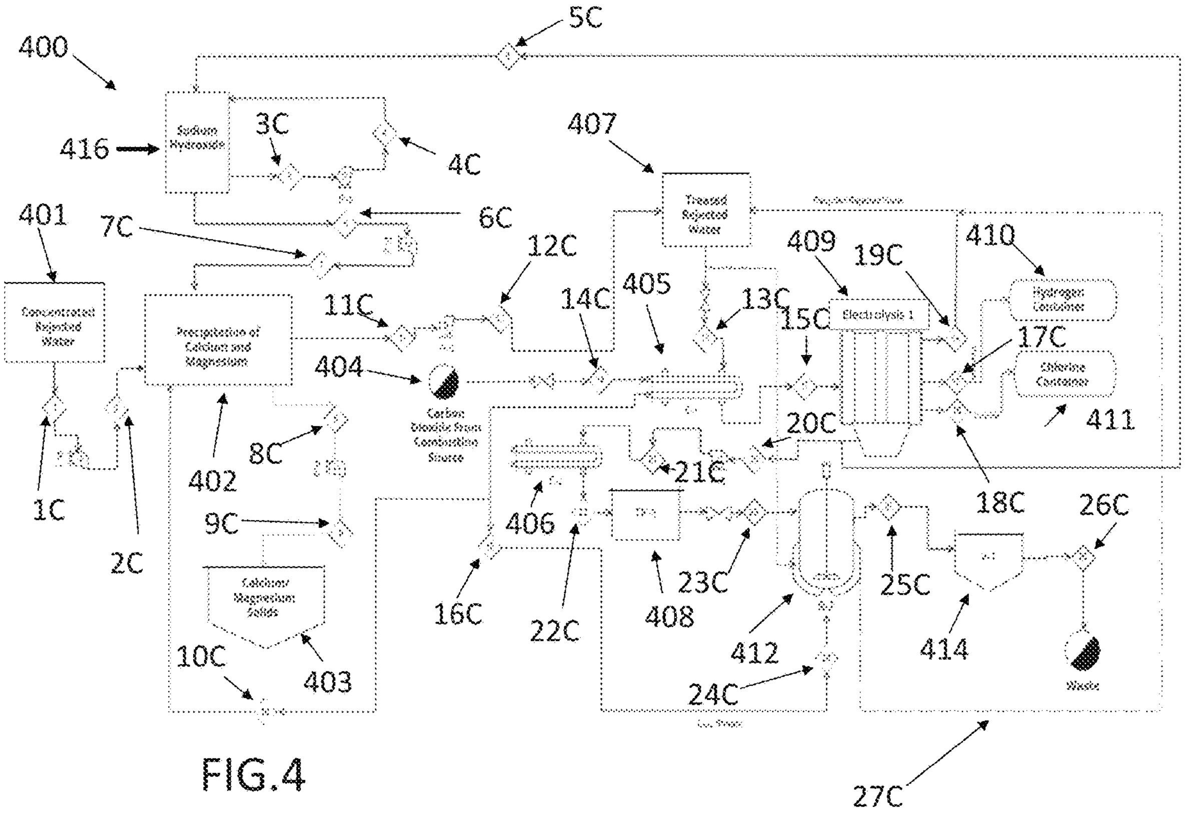
FIG. 4 is a diagram of an example recycling system.

FIG. 4 describes an example recycling system 400. As shown recycling system 400 includes concentrated rejected water 401, precipitation of calcium and magnesium 402, calcium/magnesium solids 403, carbon dioxide from combustion source 404, heat exchanger 405, heat exchanger 406, treated rejected water 407, tank 408, electrolysis 409, hydrogen container 410, chlorine container 411, continuous stirred tank reactor 412, and settling tank 414. In addition, recycling system 400 also includes piping sections through which streams of chemicals (such as stream 14C includes carbon dioxide). In embodiments, piping sections between each element of recycling system 400 may be made of 90/10 copper-nickel material to be able to withstand any corrosion issues from seawater.

As shown in FIG. 4, concentrated rejected water 401 is sent via stream 1C, a pump, and then via stream 2C to a tank with precipitation of calcium and magnesium based on a reaction of sodium hydroxide. As a result of the reaction with sodium hydroxide, calcium and magnesium solids (402) are generated and stored in one or more tank (for each product)—calcium and magnesium 403 via stream 8C another pump, and stream 9C. Also, as shown in FIG. 4, the remaining rejected water (which includes brine from a facility, such as a desalinization facility) is sent via stream 11C, another pump, and stream 12C as treated rejected water 407, which will be discussed further.

Also shown in FIG. 4, carbon dioxide ($CO_2$) from combustion source 404 is sent via stream 14C to heat exchanger 405. As discussed previously, treated rejected water 407 is sent via stream 13C through heat exchanger 405 to cool down the carbon dioxide in stream 14C. The rejected water is then sent to electrolysis 409 (via stream 15C) while the cooled down carbon dioxide is sent via stream 24C to continuous stirred tank reactor 412 and will be discussed further.

In embodiments, and as shown in FIG. 4, the treated brine water 407 sent to electrolysis 409 undergoes an electrolysis similar to that described in FIG. 5 and, as a result, unreacted brine, hydrogen, and chlorine are produced. In embodiments, the unreacted brine is sent, via stream 19C with the treated rejected water and undergoes additional electrolysis in a loop. In embodiments, the hydrogen is sent to hydrogen container 410 via stream 17C and the chlorine is sent to chlorine container 311 via stream 18C.

In embodiments, the cooled NaOH is then sent out of heat exchanger 406 via stream 22C to tank 408. As shown in FIG. 4, the cooled NaOH is then sent via stream 23C to bubble column reactor 412. In embodiments, continuous stirred tank reactor 412 causes a reaction between the NaOH and $CO_2$ ($2NaOH+CO_2 \rightarrow Na_2CO_3+H_2O$) and results in $Na_2CO_3$. In embodiments, the $Na_2CO_3$ is sent, via stream 25C to settling tank 314. In embodiments, settling tank 314 physically separates the mixture to create two separate streams of product. As shown in FIG. 4, stream 26C includes waste and stream 27C is sent back to be a part of treated rejected water 407.

In embodiments, the caustic soda is vehiculated through stream 20C via a pump and then heat exchanger 406 to tank 408 where the caustic soda is collected at concentration around 30%. Finally, at the cathode (shown as 504 in FIG. 5) the hydrogen gas will be collected and transferred to the hydrogen container via stream 26. In embodiments, the hydrogen leaving the cells is extremely concentrated (it usually has concentration higher than 99.9% by volume). In embodiments, the chlorine gas collected at the anode (shown as 505 in FIG. 5) is transferred via stream 25 to a chlorine container.

As shown in FIG. 4, the NaOH is then sent via stream 20C to a pump which then pumps stream 21C to heat exchanger 406 which uses entering cold water to reduce the temperature of the NaOH. As shown in FIG. 4, the NaOH is sent via stream 22C to tank 408. In embodiments, the NaOH solution consists of a 30% concentration. As described above, the NaOH solution is then sent via stream 23C to continuous stirred tank reactor 412 and used in further processes (also described above).

Figure 6:
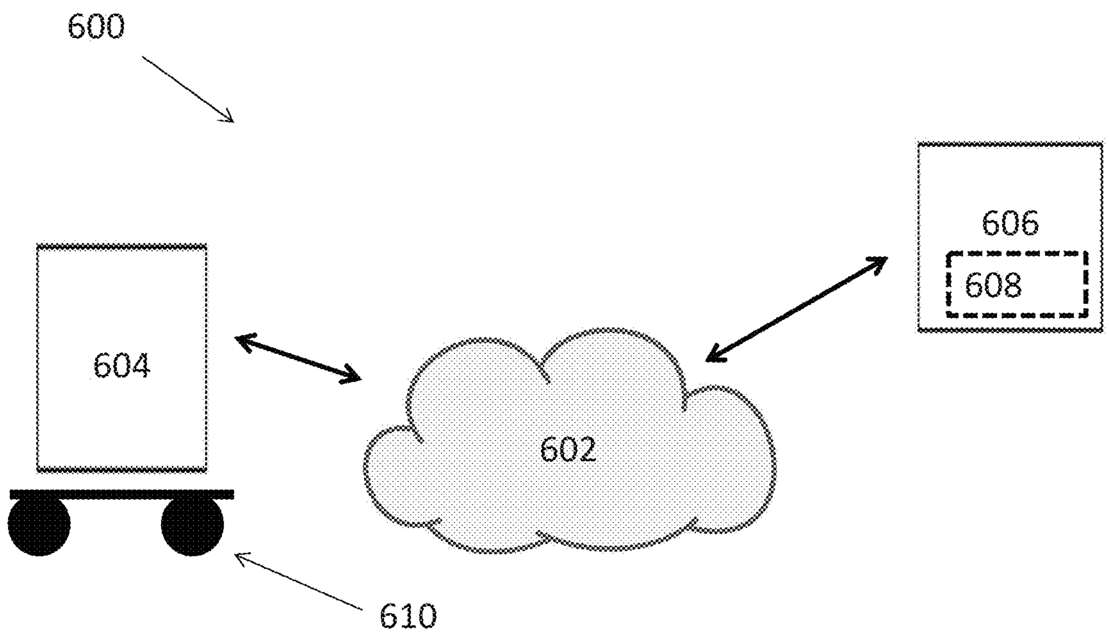
FIG. 6 is an example network diagram.

FIG. 6 is a diagram of example environment 600 in which systems, devices, and/or methods described herein may be implemented. FIG. 6 shows network 602, system 604, device 606, and application 608.

Network 602 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light Fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or network 602 may include a cellular network, a public land mobile network (PLMN), a second-generation (2G) network, a third-generation (3G) network, a fourth-generation (4G) network, a fifth-generation (5G) network, and/or another network. In embodiments, network 602 may allow for devices describe any of the described figures to electronically communicate (e.g., using emails, electronic signals, URL links, web links, electronic bits, fiber optic signals, wireless signals, wired signals, etc.) with each other to send and receive various types of electronic communications.

System 604 (e.g., system 200, 300, or 400) may include one or more devices that can communicate and/or receive electronic information to/from device 606, via network 602. In embodiments, system 604 may include heat exchangers, membrane cells, piping systems, etc., where one or more portion so system 604 may send/receive electronic information to/from device 606 to control system 604. In embodiments, system 604 may include sensors and/or gauges that communicate electronic information about pressure, temperature, and/or flow rates to device 606 via network 602. In embodiments, system 604 may be system 200, 300, or 400. In embodiments, system 604 may be powered by electrical power, solar power, and/or other type of power.

Device 606 may include any computation or communications device that is capable of communicating with a network (e.g., network 602) with other device and/or systems, such as system 604. For example, device 606 may include a computing device, a desktop computer, a laptop computer, a tablet computer, a camera, a digital watch, a digital glass, or another type of computation or communications device.

Device 606 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 606. Device 606 may have a touch screen and/or a keyboard that allows a user to electronically interact with an electronic application. In embodiments, a user may swipe, press, or touch device 606 in such a manner that one or more electronic actions will be initiated by device 606 via an electronic application.

Device 606 may include a variety of applications, such as, for example, a water analysis application, a flow rate application, a temperature application, a composition analyzer application, an e-mail application, a telephone application, a camera application, a video application, a multi-media application, a visual voice mail application, a contacts application, a data organizer application, a calendar application, an instant messaging application, a texting application, a web browsing application, a blogging application, and/or other types of applications that are a combination of two or more of the above applications.

Electronic application 608 may be capable of interacting with device 606 and/or system 604 to automatically and electronically receive electronic information for one or more persons. In embodiments, electronic application 608 may obtain electronic information about salination levels in water and carbon dioxide levels. In embodiments, electronic application 608 may be associated with a graphical user interface that may display images, generate sounds, and/or display information associated with system 604.

Figure 7:
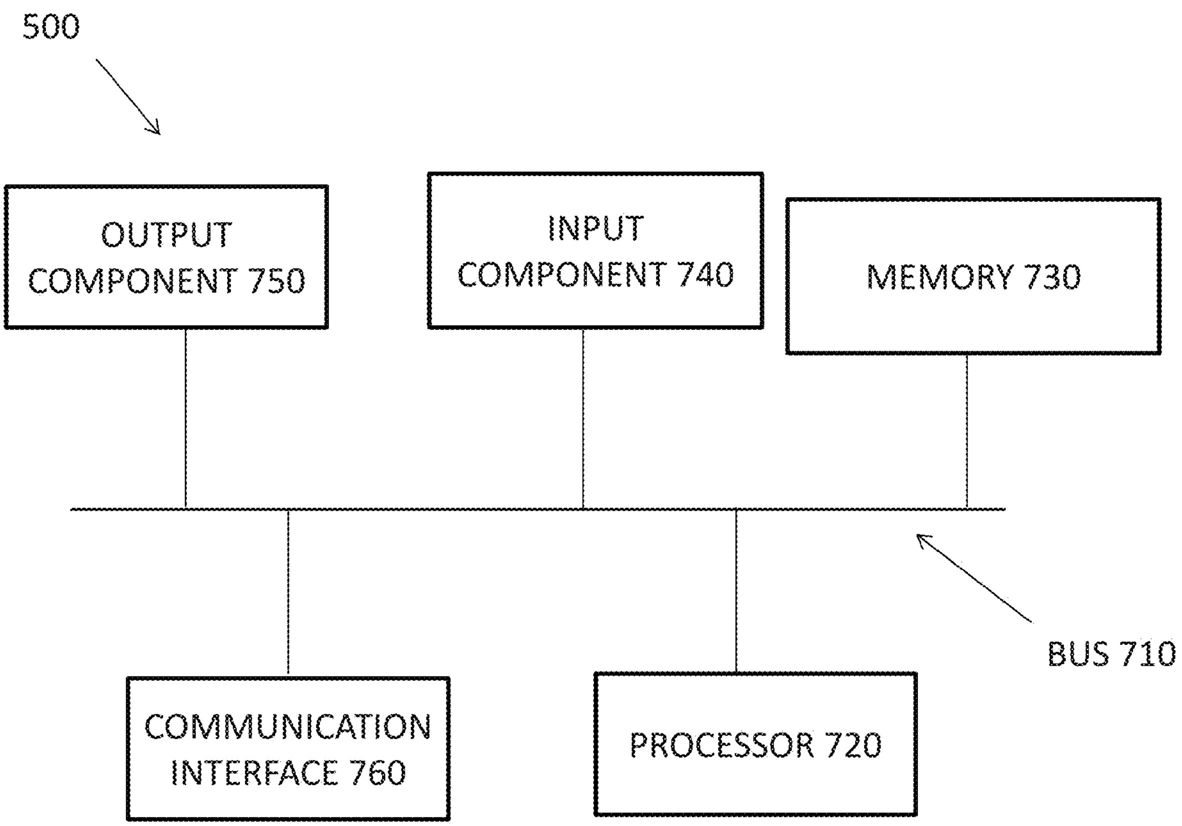
FIG. 7 is a diagram of an example computing device.

FIG. 7 is a diagram of example components of system 704 and device 706. Device 700 may correspond to computing devices, such as device 706, and/or a computing device feature that is part of any of the elements described within systems 200, 300, and 400.

As shown in FIG. 7, device 700 may include a bus 710, a processor 720, a memory 730, an input component 740, an output component 750, and a communications interface 760. In other implementations, device 700 may contain fewer components, additional components, different components, or differently arranged components than depicted in FIG. 7. Additionally, or one or more components of device 700 may perform one or more tasks described as being performed by one or more other components of device 700.

Bus 710 may include a path that permits communications among the components of device 700. Processor 720 may include one or more processors, microprocessors, or processing logic (e.g., a field-programmable gate array (FPGA) or an application-specific integrated circuit (ASIC)) that interprets and executes instructions. Memory 730 may include any type of dynamic storage device that stores information and instructions, for execution by processor 720, and/or any type of non-volatile storage device that stores information for use by processor 720.

Input component 740 may include a mechanism that permits a user to input information to device 700, such as a keyboard, a keypad, a button, a switch, etc. Output component 750 may include a mechanism that outputs information to the user, such as a display, a speaker, one or more light-emitting diodes (LEDs), etc.

Communications interface 760 may include any transceiver-like mechanism that enables device 700 to communicate with other devices and/or systems. For example, communications interface 760 may include an Ethernet interface, an optical interface, a coaxial interface, a wireless interface, or the like.

In another implementation, communications interface 760 may include, for example, a transmitter that may convert baseband signals from processor 720 to radiofrequency (RF) signals and/or a receiver that may convert RF signals to baseband signals. Alternatively, communications interface 760 may include a transceiver to perform functions of both a transmitter and a receiver of wireless communications (e.g., radiofrequency, infrared, visual optics, etc.), wired communications (e.g., conductive wire, twisted pair cable, coaxial cable, transmission line, fiber optic cable, waveguide, etc.), or a combination of wireless and wired communications.

Communications interface 760 may connect to an antenna assembly (not shown in FIG. 7) for transmission and/or reception of the RF signals. The antenna assembly may include one or more antennas to transmit and/or receive RF signals over the air. The antenna assembly may, for example, receive RF signals from communications interface 760 and transmit the RF signals over the air, and receive RF signals over the air and provide the RF signals to communications interface 760. In one implementation, for example, communications interface 760 may communicate with a network (e.g., wireless network, Internet, Intranet, etc.).

As will be described in detail below, device 700 may perform certain operations. Device 700 may perform these operations in response to processor 720 executing software instructions (e.g., a computer program(s)) contained in a computer-readable medium, such as memory 730, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 730 from another computer-readable medium or another device. The software instructions contained in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

Figure 8:
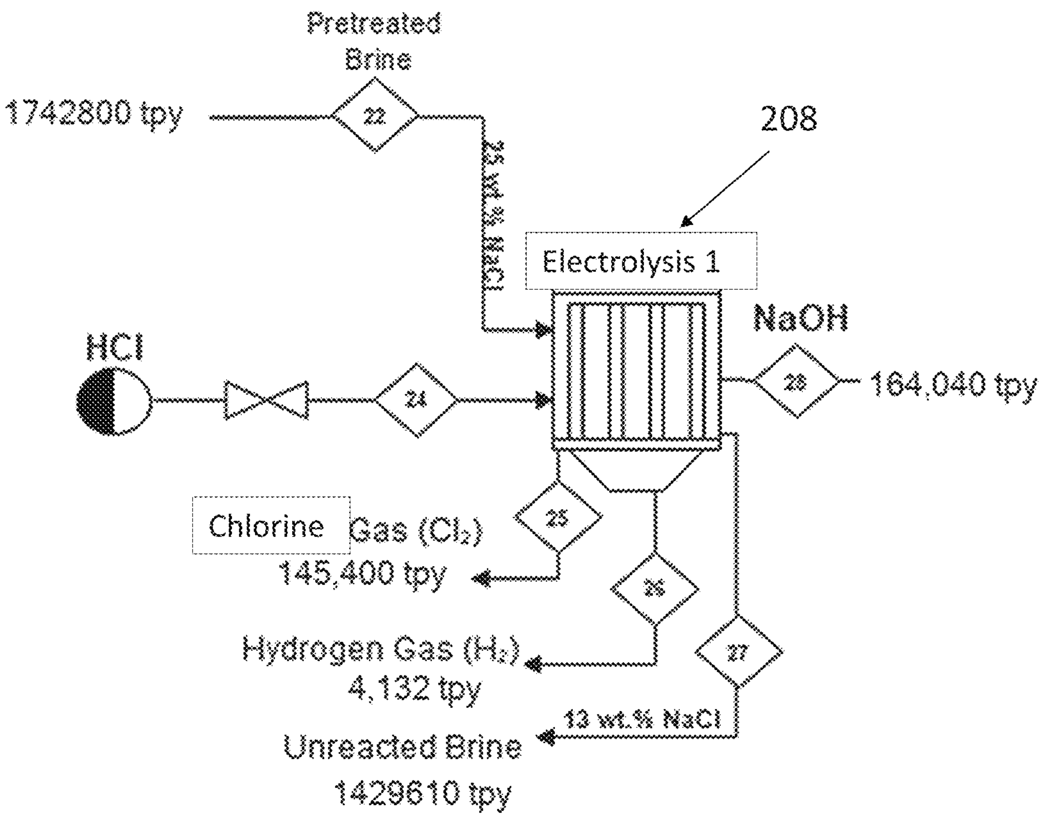
FIG. 8 is an example diagram of quantities of chemicals associated with a recycling system.
Figure 9:
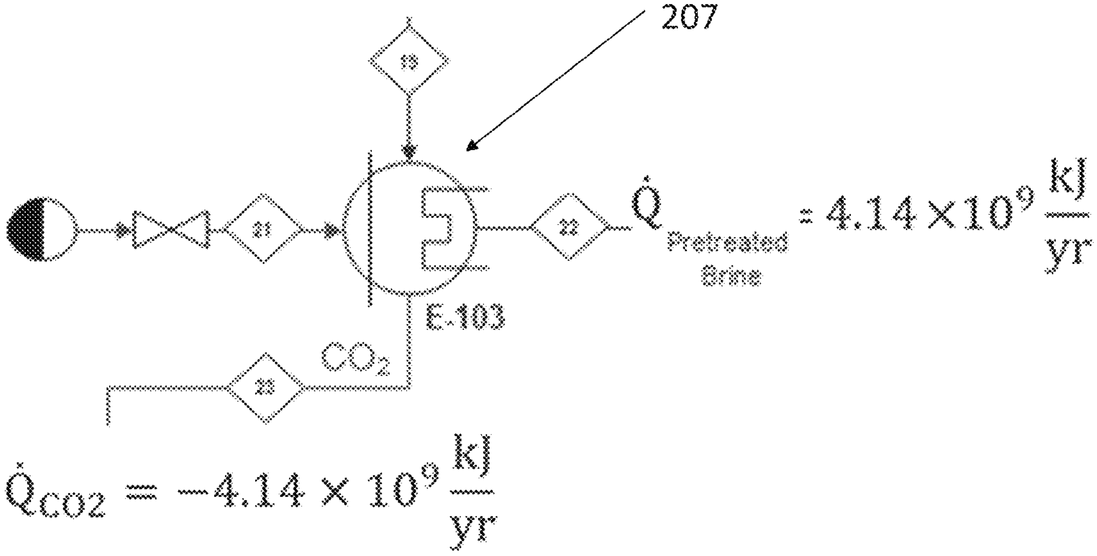
FIG. 9 is an diagram of an example energy balance.
Figure 10A:
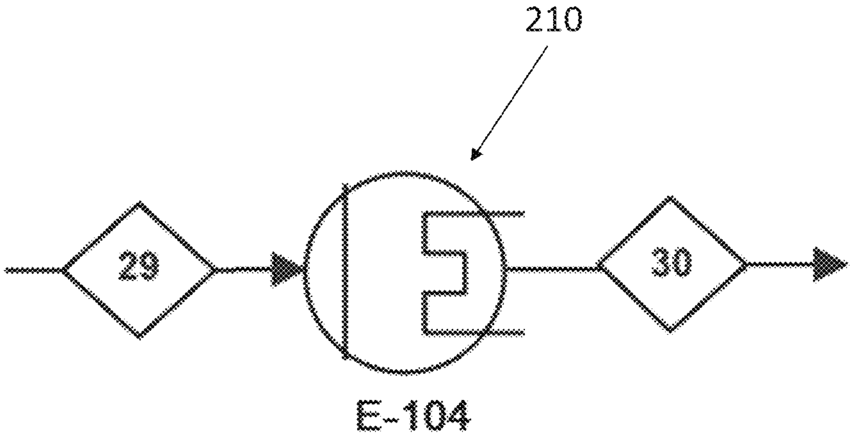
FIGS. 10A and 10B are example energy balance diagrams.
Figure 10B:
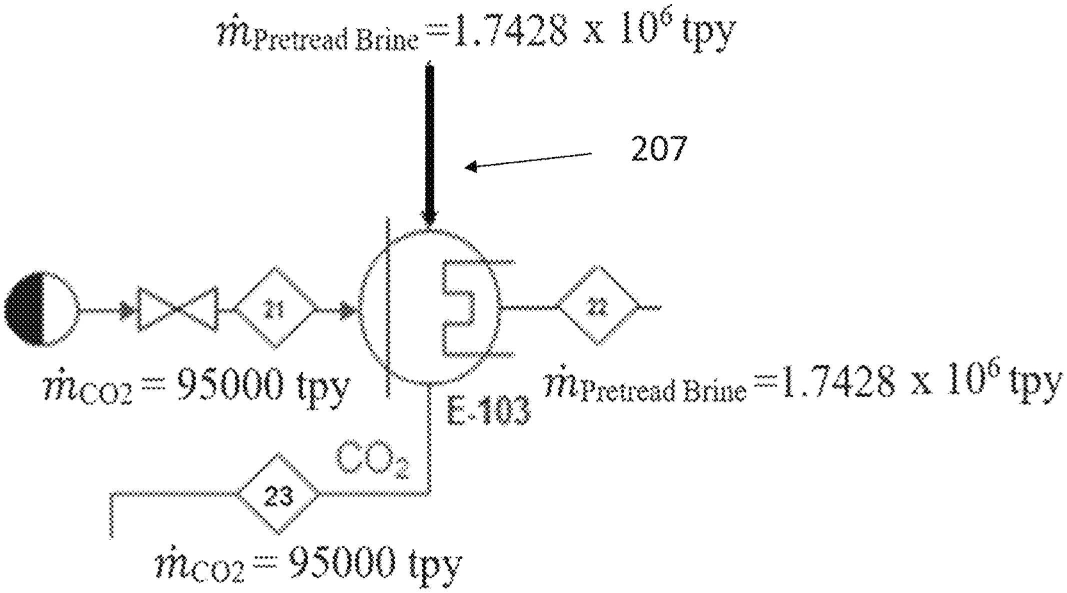
Figure 11:
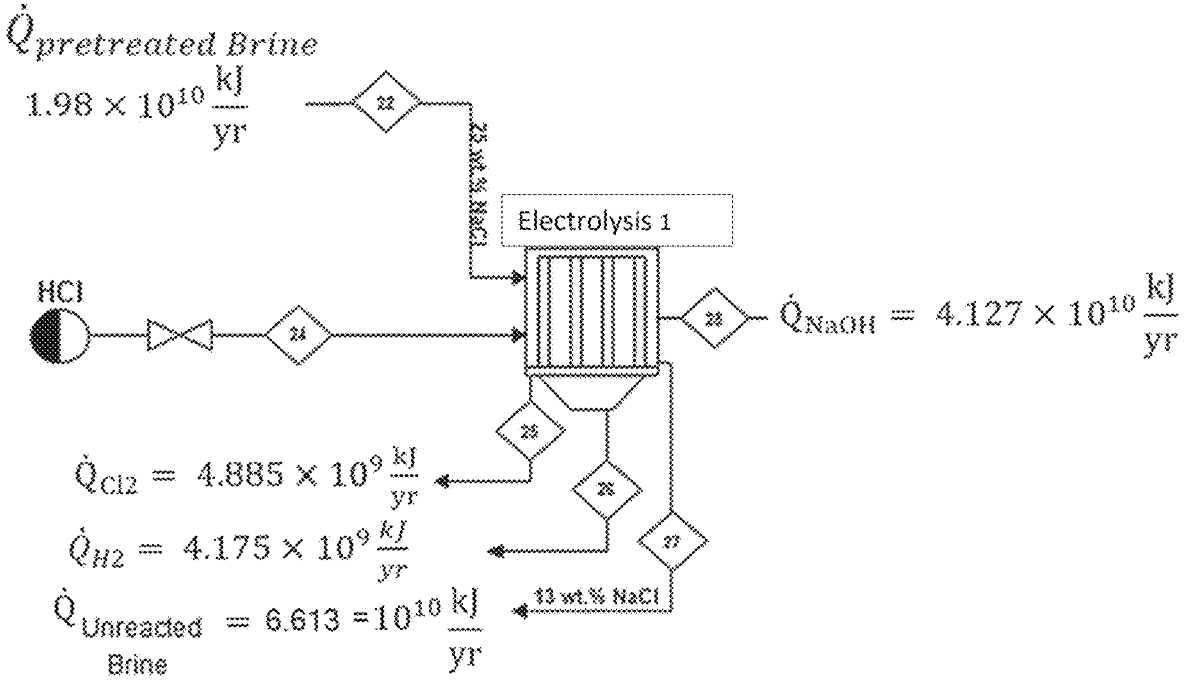
FIG. 11 is an example diagram of an energy balance.

FIG. 8 is an example diagram showing quantities that may be associated with chemicals entering and leaving an electrolysis system (such as electrolysis 208 as shown in FIG. 2 along with streams 22, 24, 25, 26, 27, and 28). FIG. 9 is an example diagram showing heat transfer rates associated with chemicals entering and leaving a heat exchanger (such as heat exchanger 207 shown in FIG. 2 along with streams 19, 21, 22, and 23). FIG. 10A is an example diagram showing heat transfer rates associated with chemicals entering and leaving a heat exchanger (such as heat exchanger 210 shown in FIG. 2 along with streams 29 and 30). FIG. 10B is an example diagram showing a mass balance associated with FIG. 2 showing the amount of carbon dioxide (in a non-limiting example) that should be sequestered. FIG. 11 is an example diagram showing heat transfer rates associated with chemicals entering and leaving an electrolysis system (such as electrolysis 208 as shown in FIG. 2 along with streams 22, 24, 25, 26, 27, and 28).

Figure 12A:
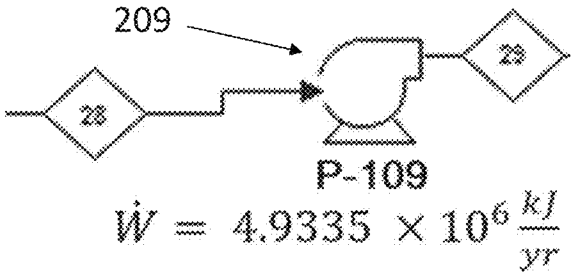
FIGS. 12A-12C are example diagrams of work being done over time.
Figure 12B:
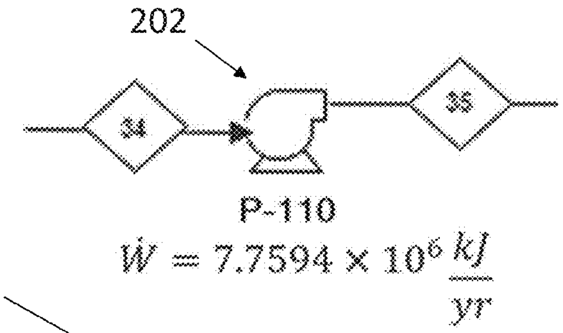
Figure 12C:
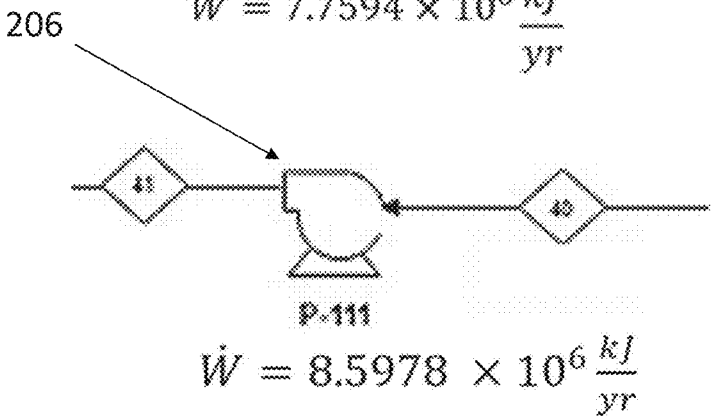

FIGS. 12A, 12B, and 12C are example diagrams showing rates of work occurring through different pumps associated with FIG. 2. FIG. 13A is an example table showing temperature, pressure, total mass flow rate, and total mole flow rate for streams 19 to 28. FIG. 13B is an example table showing quantities of chemicals associated with streams 19 to 28. FIG. 14A is an example table showing temperature, pressure, total mass flow rate, and total mole flow rate for streams 29 to 38. FIG. 14B is an example table showing quantities of chemicals associated with streams 29 to 38. FIG. 15 is an example table showing temperature, pressure, total mass flow rate, and total mole flow rate associated with streams 39 to 41. FIG. 15 also shows quantities of chemicals associated with streams 39 to 41.

Figure 16:
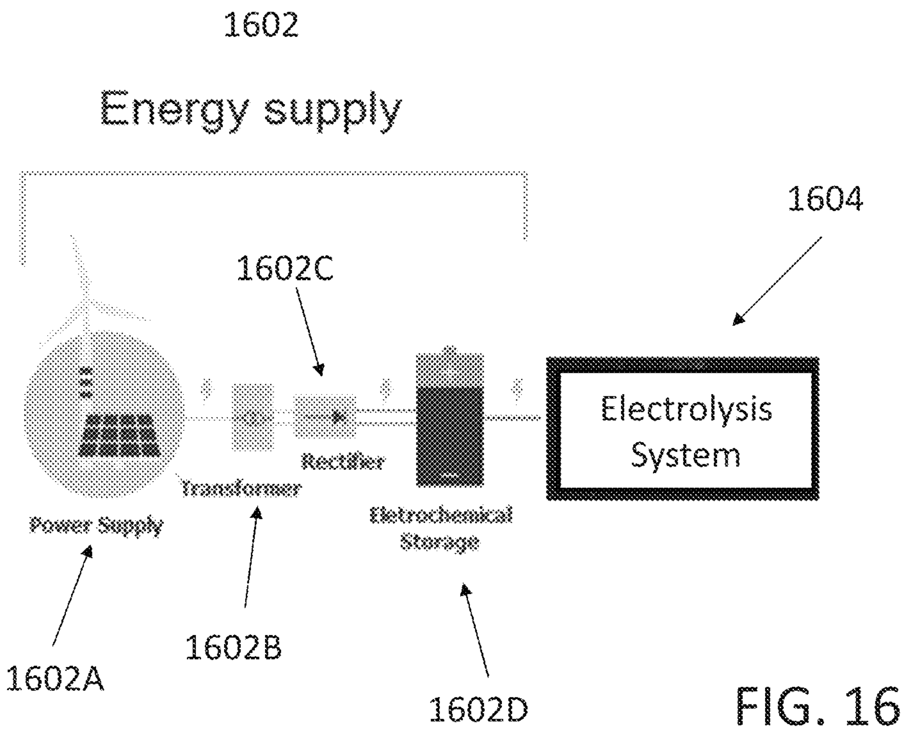
FIG. 16 is an example recycling system.

FIG. 16 is a diagram of an energy system 1600. As shown in FIG. 16, section 1602 describes a solar energy generating system. As shown in FIG. 16, section 1602 includes power supply 1602A, transformer 1602B, rectifier 1602C, and an electrochemical storage 1602D. In embodiments, once solar power is generated by section 1602, the solar power is used by electrolysis 1604 for an electrolysis process. In embodiments, electrolysis 1604 may be similar to electrolysis 500 described in FIG. 5. In embodiments, energy system 1600 may be used for systems described in FIGS. 1-4.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:

receiving, by a recycling system, carbon dioxide;

sending the carbon dioxide through a first heat exchanger within the recycling system, wherein the carbon dioxide is sent to a bubble reactor after passing through the first heat exchanger;

receiving, by the recycling system, pre-treated brine;

sending the pre-treated brine through the first heat exchanger in the recycling system and then sending the pre-treated brine to an electrolysis system, wherein the pre-treated brine has sodium chloride and water;

receiving, by the recycling system, hydrochloric acid, and sending the hydrochloric acid to the electrolysis system;

generating, by the electrolysis system within the recycling system, sodium hydroxide, hydrogen gas, and unreacted brine, based on the electrolysis system using the pre-treated brine, which includes the sodium chloride and water, and the hydrochloric acid;

sending the sodium hydroxide to a second heat exchanger and then sending the sodium hydroxide to a continuous stirred tank reactor;

receiving, by the recycling system, water;

receiving, by the recycling system, ammonia;

mixing, by a mixing vessel within the recycling system, the water and ammonia to generate a mixture, wherein the mixture is ammonia solution;

sending a first portion of the mixture to a settling tank within the recycling system;

sending a second portion of the mixture to a bubble column reactor within the recycling system;

sending the carbon dioxide to the bubble column reactor;

generating, by the bubble column reactor, (NH4)2CO3 and water based on the carbon dioxide and the mixture of the water and the ammonia;

sending, by the recycling system, the (NH4)2CO3 to the continuous stirred tank reactor;

generating, by the continuous stirred tank reactor in the recycling system, Na2CO3+(NH3+H2O) based on the continuous stirred tank reactor receiving the (NH4)2CO3 and the sodium hydroxide;

sending, by the recycling system, the Na2CO3+(NH3+H2O) to the settling tank; and separating, by the settling tank within the recycling system, the Na2CO3+(NH3+H2O) into NA2CO3 and additional NH3+H2O, wherein:

the additional $NH_3+H_2O$ is sent back and added to the ammonia solution that is generated by the mixing vessel.

2. The method of claim 1, wherein:

the bubble column reactor is located in parallel with the electrolysis system; and the continuous stirred tank is located after the bubble column reactor.

3. The method of claim 1, wherein:

the settling tank is located after the continuous stirred tank reactor.

4. The method of claim 1, wherein:

the first heat exchanger is located before the electrolysis system, and the second heat exchanger is located after the electrolysis system and before the continuous stirred tank reactor.

5. The method of claim 4, wherein the first heat exchanger reduces the carbon dioxide's temperature.

6. The method of claim 4, wherein the electrolysis system generates the sodium hydroxide by:

filling the pre-treated brine in an anode chamber within an electrolytic cell;

filling pure water in a cathode chamber of the electrolytic cell;

applying a direct current, wherein the current disperses the pure water and pre-treated brine mixture into cations and anions in which each of the cations and anions will move to the opposite charged electrode, wherein:

hydrogen cations $H^+$ are attracted to the cathode, chlorine anions are attracted toward the anode, and $Na^+$ ions diffuse through an ion exchange membrane to reach the pure water within the cathode chamber in which the $Na^+$ ions react with $OH^-$ found in the pure water to generate the sodium hydroxide.

* * * * *